United States Patent
Ali et al.

(10) Patent No.: US 10,693,407 B2
(45) Date of Patent: Jun. 23, 2020

(54) DRIVER UNIT FOR AN INTERIOR PERMANENT MAGNET MOTOR AND A MOTOR ASSEMBLY USING THE SAME

(71) Applicant: General Electric Company, Schenectady, NY (US)

(72) Inventors: Shahid Ali, Bangalore (IN); Rahul Radhakrishna Pillai, Bangalore (IN); Jigarkumar Narendrabhai Hingu, Bangalore (IN); Vandana Rallabandi, Lexington, KY (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 82 days.

(21) Appl. No.: 15/462,204

(22) Filed: Mar. 17, 2017

(65) Prior Publication Data
US 2017/0272021 A1    Sep. 21, 2017

(30) Foreign Application Priority Data
Mar. 17, 2016  (IN) .............. 201641009431

(51) Int. Cl.
*H02P 25/03*   (2016.01)
*H02P 6/182*   (2016.01)
(Continued)

(52) U.S. Cl.
CPC .............. *H02P 25/03* (2016.02); *H02P 6/182* (2013.01); *H02P 6/21* (2016.02); *H02P 27/06* (2013.01); *H02P 29/50* (2016.02)

(58) Field of Classification Search
CPC ......... H02P 6/007; H02P 7/0094; H02P 6/183
See application file for complete search history.

(56) References Cited

U.S. PATENT DOCUMENTS

| 4,912,378 A | * | 3/1990 | Vukosavic | .............. | H02P 6/182 |
| | | | | | 318/400.04 |
| 5,481,166 A | * | 1/1996 | Moreira | .................... | H02P 6/18 |
| | | | | | 318/400.04 |

(Continued)

FOREIGN PATENT DOCUMENTS

CN    103929109 A    7/2014
CN    103199788 B    4/2015
(Continued)

OTHER PUBLICATIONS

J. M. Liu, Z. Q. Zhu, Improved Sensorless Control of Permanent-Magnet Synchronous Machine Based on Third-Harmonic Back EMF, May/Jun. 2014, IEEE Transactions on Industry Applications, vol. 50, pp. 1861-1869 (Year: 2014).*

(Continued)

*Primary Examiner* — Bickey Dhakal
(74) *Attorney, Agent, or Firm* — Baker Hughes Company

(57) ABSTRACT

A driver unit for an interior permanent magnet motor (IPM) is presented. The driver unit includes sensor electronics configured to sense a phase voltage corresponding to one or more phase terminals of the IPM motor to generate a corresponding phase voltage signal. The driver unit further includes a controller electrically coupled to the sensor electronics and configured to extract one or more triplen harmonics of an order of a ninth harmonic and higher than the ninth harmonic of a fundamental frequency of the phase voltage signal corresponding to the one or more phase terminals. The controller is further configured to determine an angular position of a rotor of the IPM motor based on the extracted one or more triplen harmonics. Related motor assembly and method for controlling the IPM motor are also presented.

20 Claims, 3 Drawing Sheets

(51) Int. Cl.
*H02P 6/21* (2016.01)
*H02P 27/06* (2006.01)
*H02P 29/50* (2016.01)

(56) References Cited

U.S. PATENT DOCUMENTS

| | | |
|---|---|---|
| 7,132,816 B1 | 11/2006 | Markunas et al. |
| 7,511,439 B2 * | 3/2009 | Bosch .................... H02P 6/182 318/254.1 |
| 9,595,903 B2 | 3/2017 | Hawes et al. |

FOREIGN PATENT DOCUMENTS

| | | |
|---|---|---|
| JP | 2003-219683 A | 7/2003 |
| WO | 2011/126462 A1 | 10/2011 |

OTHER PUBLICATIONS

Liu, J.M., et al., "Improved Sensorless Control of Permanent-Magnet Synchronous Machine Based on Third-Harmonic Back EMF," IEEE Transactions on Industry Applications, vol. 50, No. 3, pp. 1861-1870 (May-Jun. 2014).

Meng, G., et al., "Initial position estimation of permanent magnet synchronous motors based on variation behaviour of winding inductances," 9th International Conference on Power Electronics and ECCE Asia (ICPE-ECCE Asia), pp. 1609-1616 (Jun. 1-5, 2015).

* cited by examiner

US 10,693,407 B2

DRIVER UNIT FOR AN INTERIOR PERMANENT MAGNET MOTOR AND A MOTOR ASSEMBLY USING THE SAME

BACKGROUND

Embodiments of the present disclosure relate to a motor assembly, and more particularly to a motor assembly having an interior permanent magnet (IPM) motor and a driver unit configured to determine an angular position of a rotor of the IPM motor.

Electric machines such as permanent magnet synchronous motors have been used in variety of applications, including but not limited to electric pumps, electric or hybrid vehicles, as well as home and industrial appliances that employ rotary components, traction motors, and the like. Types of the permanent magnet synchronous motors may include surface permanent magnet (SPM) motors and the IPM motors. A permanent magnet synchronous motor typically includes a stator having stator winding including one or more phases, and a rotor having permanent magnets. The rotor may be disposed within the stator. Typically, to operate the permanent magnet synchronous motors, it is desirable that the phases of the stator winding are operated in a predetermined sequence. Therefore, it is desirable to determine an angular position of the rotor (hereinafter referred to as a "rotor position") in order to determine voltage and/or current that is to be applied to the stator winding.

Some of the currently available systems employ one or more position sensors and/or encoders along with the permanent magnet synchronous motor to determine the rotor position. Sometimes, an operation of the position sensors and/or encoders is unreliable under certain harsh conditions including, but not limited to, increased temperatures (e.g., at the temperatures of about a few hundreds of degree centigrade). Further, the position sensors and/or encoders occupy additional space. Consequently, resulting motor assemblies employing such position sensors and/or encoders are not as compact. Moreover, use of the position sensors and/or encoders results in costly motor assemblies.

Further, some systems entail using a third harmonic of a back-electromotive force (EMF) generated by a motor to estimate the rotor position. However, in case of motors, such as the IPM motors which have saliency in the rotor, the back-EMF may vary with variations in load. More particularly, the third harmonic of the back-EMF is affected by the load variations. Especially, a phase angle of the third harmonic, which is indicative of the rotor position, is altered due to the load variations. Consequently, use of information corresponding to the third harmonic is unreliable for determining the rotor position of the IPM motors.

BRIEF DESCRIPTION

In accordance with aspects of the present specification, a driver unit for an interior permanent magnet (IPM) motor is presented. The driver unit includes sensor electronics configured to sense a phase voltage corresponding to one or more phase terminals of the IPM motor to generate a corresponding phase voltage signal. The driver unit further includes a controller electrically coupled to the sensor electronics and configured to extract one or more triplen harmonics of an order of a ninth harmonic and higher than the ninth harmonic of a fundamental frequency of the phase voltage signal corresponding to the one or more phase terminals. The controller is further configured to determine an angular position of a rotor of the IPM motor based on the extracted one or more triplen harmonics.

In accordance with yet another aspect of the present specification, a motor assembly is presented. The motor assembly includes an IPM motor including one or more phase terminals, a rotor, and a stator. The motor assembly further includes a driver unit electrically coupled to the IPM motor at the one or more phase terminals. The driver unit includes sensor electronics configured to sense a phase voltage corresponding to one or more phase terminals of the IPM motor to generate a corresponding phase voltage signal. The driver unit further includes a controller electrically coupled to the sensor electronics and configured to extract one or more triplen harmonics of an order of a ninth harmonic and higher than the ninth harmonic of a fundamental frequency of the phase voltage signal corresponding to the one or more phase terminals. The controller is further configured to determine an angular position of a rotor of the IPM motor based on the extracted one or more triplen harmonics.

In accordance with yet another aspect of the present specification, a method for controlling an IPM motor is presented. The method includes receiving phase voltage signals corresponding to one or more phase terminals of the IPM motor. The method further includes extracting one or more triplen harmonics of an order of a ninth harmonic and higher than the ninth harmonic of a fundamental frequency of the phase voltage signal corresponding to the one or more phase terminals. Furthermore, the method includes determining an angular position of a rotor of the IPM motor based on the extracted one or more triplen harmonics. Moreover, the method includes supplying at least one of a phase current or phase voltage to the one or more phase terminals based at least on the angular position of a rotor.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system may extend beyond the described embodiments.

In the following specification, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In accordance with some aspects of the present specification, a motor assembly is presented. The motor assembly includes an interior permanent magnet motor including one or more phase terminals, a rotor, and a stator. The motor assembly further includes a driver unit electrically coupled to the interior permanent magnet motor at the one or more phase terminals. The driver unit includes sensor electronics configured to sense a phase voltage corresponding to one or more phase terminals of the interior permanent magnet motor to generate a corresponding phase voltage signal. The driver unit further includes a controller electrically coupled to the sensor electronics and configured to extract one or more triplen harmonics of an order of a ninth harmonic and higher than the ninth harmonic of a fundamental frequency of the phase voltage signal corresponding to the one or more phase terminals. The term "triplen harmonic," as used herein refers to a harmonic of a fundamental frequency in multiples of three. For example, if the fundamental frequency of the phase voltage is F, then the triplen harmonics may include all harmonics 3*n*F, where n is an integer. The controller is further configured to determine an angular position of a rotor of the interior permanent magnet motor based on the extracted one or more triplen harmonics.

Figure 1:
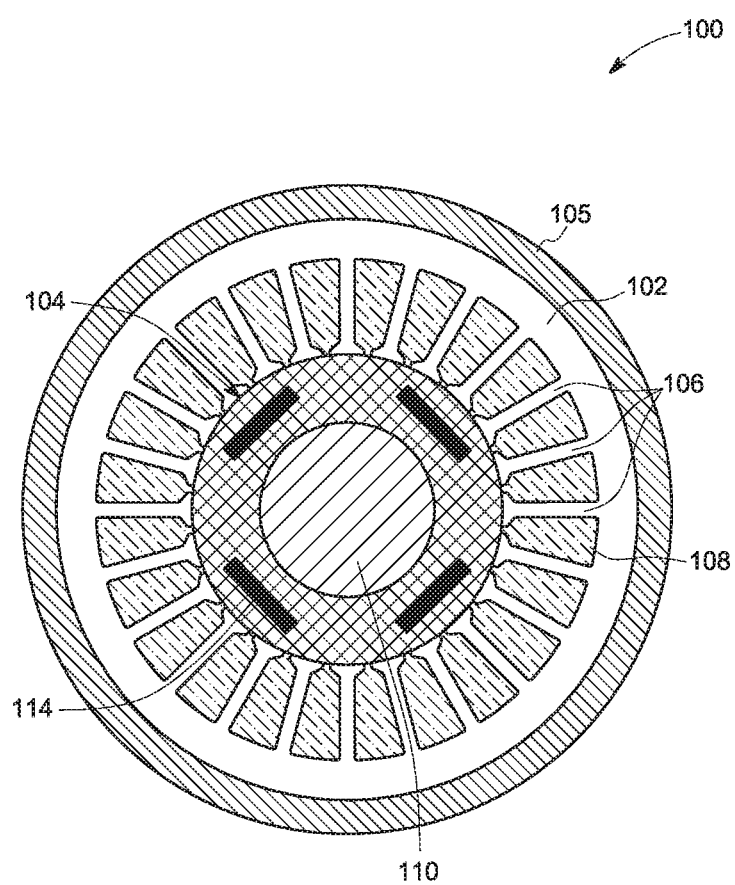
FIG. 1 is a diagrammatical illustration of a cross-sectional view of a typical interior permanent magnet (IPM) motor.

FIG. 1 is a diagrammatical illustration of a cross-sectional view of a typical interior permanent magnet (IPM) motor 100. The IPM motor 100 may include a stator 102 and a rotor 104 disposed in a housing 105. The stator 102 may include a plurality of stator poles 106 and stator winding 108 disposed surrounding the stator poles 106. The stator winding 108 may be a multi-phase (e.g., three-phase) winding.

Further, as depicted in FIG. 1, the rotor 104 is disposed within the stator 102. The rotor 104 may include a rotor shaft 110, a rotor core 112, and a plurality of permanent magnets 114 (hereinafter referred to as "rotor poles" 114). The rotor core 112 may be mounted on the rotor shaft 110. The rotor core 112 may be formed of a solid material block or a plurality of laminates. Moreover, the rotor poles 114 are disposed within the rotor core 112. More particularly, the rotor poles 114 are disposed in slots (not marked in FIG. 1) formed in the rotor core 112.

In operation, when the IPM motor 100 is energized by supplying electricity to the stator winding 108, current flowing through the stator winding 108 generates an electromagnetic field around the rotor 104. The electromagnetic field interacts with a magnetic field of the rotor 104 resulting in a torque being applied on the rotor 104. Such torque, which is generated due to flux linkage between the electromagnetic field (caused due to the stator winding 108) and the magnetic field (caused due to the rotor poles 114), is hereinafter referred to as a "primary torque." Typically, in such IPM motor 100, there also exists a reluctance torque, hereinafter referred to as a "secondary torque." The secondary torque may be caused by a magnetic flux that is induced in the rotor core 112 due to the presence of the magnetic field of the rotor poles 114. For example, shape and location of the slots in the rotor core 112 are designed to channel the magnetic flux such that the rotor 104 experiences the secondary torque to align the magnetic flux lines with continuously changing electromagnetic flux lines generated by the stator winding 108. Application of such torque (e.g., a combination of the primary torque and the secondary torque) imparts a rotational motion to the rotor 104.

Typically, to operate the IPM motor 100, it is desirable that one or more of the phases of the stator winding 108 are supplied with appropriate phase currents and voltages to achieve desired torque and rotational speed (rpm) of the rotor 104. Information of an angular position (hereinafter referred to as a rotor position) of the rotor 104 may aid in supplying suitable phase currents and voltages, thereby effectively operating the IPM motor 100 such that the desired torque and rotational speed of the rotor 104 are achieved. Therefore, it is desirable to determine the angular position of the rotor 104 in order to adjust the phase current and phase voltage that is to be supplied to one or more of the phases of the stator winding 108. To that end, some embodiments of the present specification are directed to a driver unit capable of determining the rotor position and a motor assembly employing such driver unit. In a particular embodiment, the driver unit may determine the rotor position in the IPM motors without employing a position sensor. Further, some embodiments of the present specification are directed to a method for controlling the IPM motor.

Figure 2:
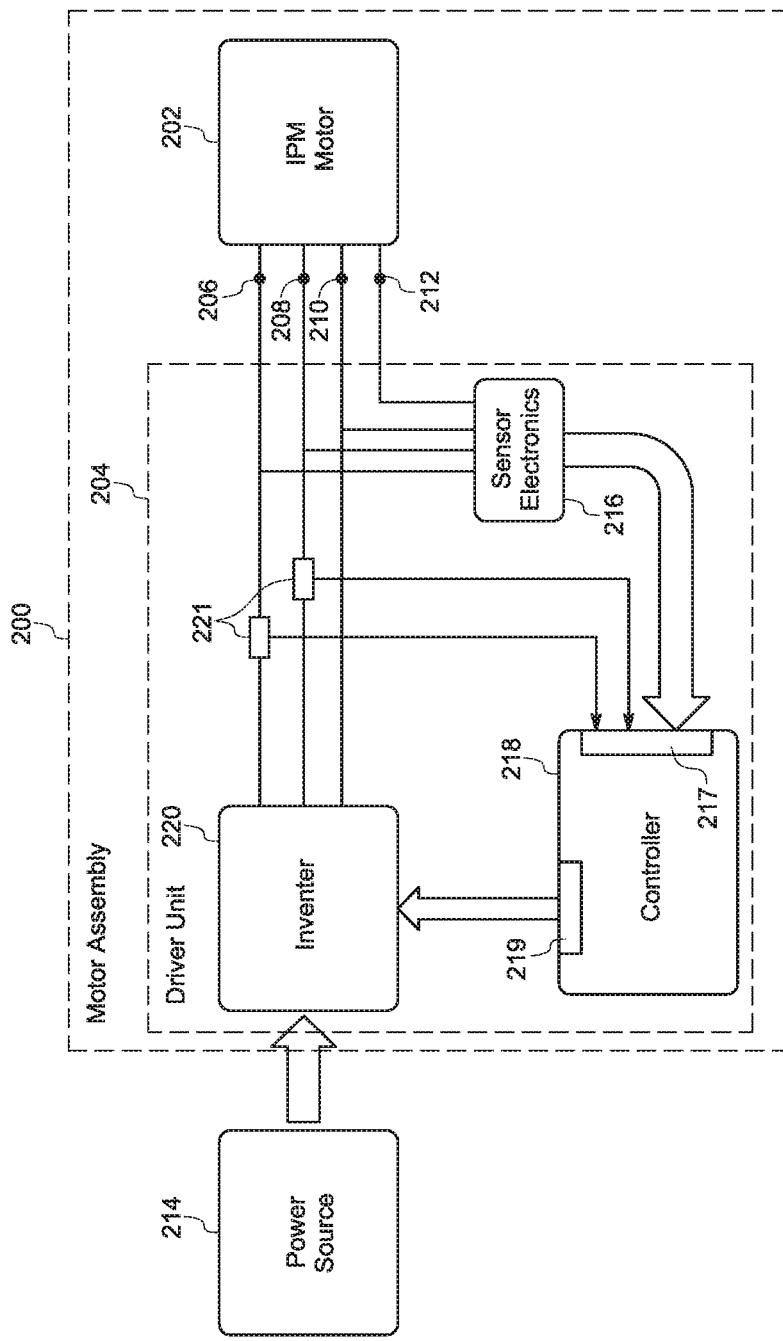
FIG. 2 is a block diagram of a motor assembly, in accordance with aspects of the present specification.

FIG. 2 is a block diagram of a motor assembly 200, in accordance with aspects of the present specification. In some embodiments, the motor assembly 200 may include an IPM motor 202, which is electrically coupled to a driver unit 204. In some embodiments, the IPM motor 202 may be similar to the IPM motor 100 of FIG. 1. The IPM motor 202 may include three phase terminals 206, 208, 210, and a neutral terminal 212. More particularly, the phase terminals 206-210 may be electrically coupled to corresponding phases of a stator winding of the IPM motor 202 for supplying phase currents thereto.

The driver unit 204 may receive a direct current (DC) power from a power source 214. Further, an output of the driver unit 204 may be coupled to the phase terminals 206-210 of the IPM motor 202 for supplying the phase currents to the stator winding of the IPM motor 202. The driver unit 204 may include sensor electronics 216, a controller 218, and an inverter 220.

In some embodiments, the sensor electronics 216 may be electrically coupled to the controller 218. The sensor electronics 216 may be configured to sense a phase voltage corresponding to the phase terminals 206-210 of the IPM motor 202 to generate a corresponding phase voltage signal. In some embodiments, the phase voltage(s) may be sensed with respect to a voltage level at the neutral terminal 212. In some embodiments, the phase voltage(s) may be sensed with respect to a voltage level at a virtual neutral (not shown in FIG. 2). In a non-limiting example, the virtual neutral may be created by a set of three resistors connected across the three phase terminals 206-210 of the IPM motor 202. In such an instance, when the phase voltage(s) are sensed with respect to the voltage level at the virtual neutral, in some embodiments, only two phases may be excited at any given time.

The sensor electronics 216 may include one or more sensors (not shown in FIG. 2) capable of sensing voltage signals at the phase terminals 206-210. Additionally, in some embodiments, the sensor electronics 216 may include a signal conditioning circuit (not shown in FIG. 2) that may amplify the sensed voltage signals. In some embodiments, the phase voltage signals may be representative of a back-electromotive force (EMF) of the IPM motor 202. In the presently contemplated example, the phase voltage signals may include 3 (three) voltage signals each of which is representative of the back-EMF of the IPM motor 202 at the respective one of the three phase terminals 206-210. In a non-limiting example, the phase voltage signals may be substantially sinusoidal.

In some embodiments, the driver unit 204 may also include one or more current sensors 221 disposed in current paths from the inverter 220 to the one or more of the phase terminals 206-210. In a non-limiting example, a current sensor 221 may be disposed between outputs of the inverter 220 and the three phase terminals 206-210, as depicted in FIG. 2.

In some embodiments, the inverter 220 may be electrically coupled to the controller 218 and the phase terminals 206-210 of the IPM motor 202. The inverter 220 may be configured to control supply of phase currents to the one or more phase terminals 206-210 based on a control command received from the controller 218.

The controller 218 has an input port 217 and an output port 219. The input port 217 and the output port 219 may include a plurality of terminals, hereinafter, respectively referred to as "input terminals" and "output terminals," respectively. The controller 218 may be electrically coupled to the sensor electronics 216 and the one or more current sensors 221 at the input port 217. Moreover, the output port 219 of the controller 218 may be coupled to the inverter 220 (described later). In one embodiment, the controller 218 may include a specially programmed general purpose computer, a microprocessor, a digital signal processor, and/or a microcontroller. The controller 218 may also include input/output ports, such as ports 217 and 219, and a storage medium, such as, an electronic memory. Various examples of the microprocessor include, but are not limited to, a reduced instruction set computing (RISC) architecture type microprocessor or a complex instruction set computing (CISC) architecture type microprocessor. Further, the microprocessor may be of a single-core type or multi-core type.

Figure 3:
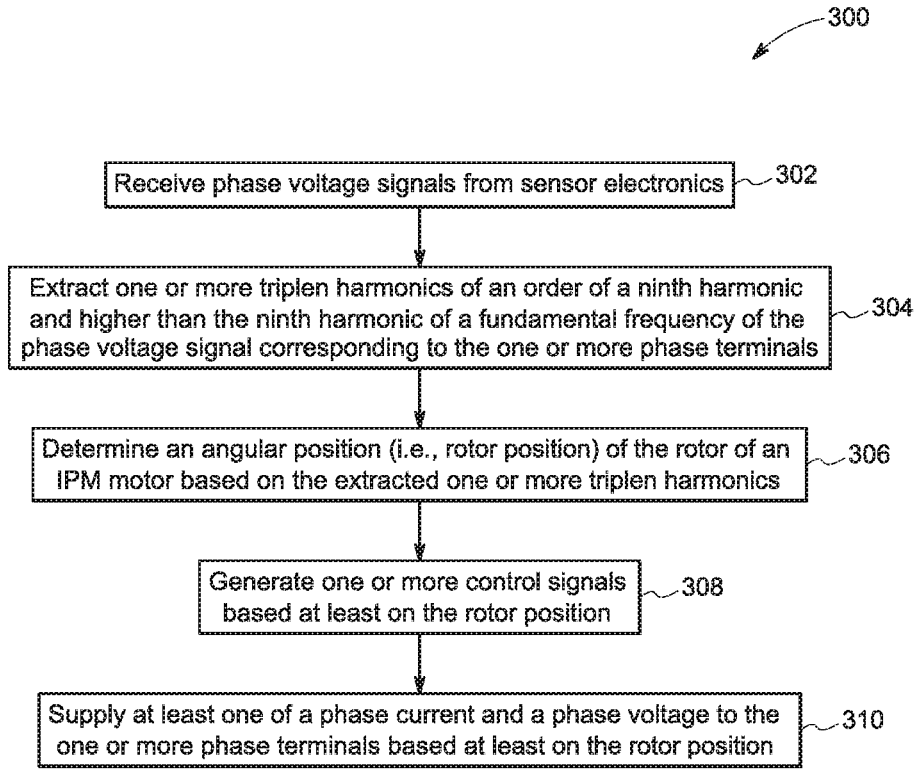
FIG. 3 is a flowchart of an example method of controlling an IPM motor, in accordance with aspects of the present specification.

In some embodiments, the controller 218 may be configured to control the IPM motor 202 when the IPM motor 202 is operating. In some embodiments, the IPM motor 202 may be started in an open loop mode. For example, typically in the open loop mode start, the controller 218 may be configured to control the driver unit 204 such that phase voltage/current(s) with a predefined frequency with a predefined voltage to frequency ratio is applied to the IPM motor 202. Thereafter, the frequency of the phase current(s) may be gradually increased so that the rotor rotates synchronously with the electromagnetic field caused by the stator winding 130 until rotation of the rotor of the IPM motor 202 reaches a predefined speed where the back-EMF magnitude reaches predefined level such that the triplen harmonics may be extracted from the back-EMF. In some embodiments, to start the IPM motor 202, the controller 218 may be configured to control the driver unit 204 such that the phase voltage(s) and/or current(s) is applied to the IPM motor 202 based on an inductance profile of the IPM motor 202. In some embodiments, the inductance profile of the IPM motor 202 may be indicative of the rotor position. Once the IPM motor 202 is started, in one embodiment, the controller 218 may be configured to control the IPM motor 202 by performing one or more steps depicted in FIG. 3. FIG. 3 is a flowchart 300 of an example method of controlling an IPM motor (e.g., the IPM motor 202), in accordance with aspects of the present specification. In one embodiment, the controller 218 may be configured to perform steps 302-310 of FIG. 3 to control functioning of the IPM motor 202. For ease of description and clarity, FIG. 3 is described in conjunction with FIG. 2.

At step 302, the controller 218 may be configured to receive the phase voltage signals from the sensor electronics 216. The phase voltage signals received by the controller 218 from the sensor electronics 216 may or may not be on a real-time basis. Further, in one embodiment, the controller 218 may receive the phase voltage signals in a continuous fashion. In another embodiment, the controller 218 may be configured to receive the phase voltage signals intermittently. For example, the controller 218 may be configured to receive the phase voltage signals at regular intervals of time (i.e., periodically), or at random intervals of time (i.e., sporadically).

Subsequently, at step 304, the controller 218 may be configured to extract one or more triplen harmonics of an order of a ninth harmonic and higher than the ninth harmonic of a fundamental frequency of the phase voltage signal corresponding to the one or more phase terminals 206-210. Further details of the method of extracting the one or more triplen harmonics of the order of the ninth harmonic and higher than the ninth harmonic is described in detail in conjunction with FIG. 4.

It may be noted that the phase angle of a triplen harmonic is indicative of an angular position of the rotor (i.e., the rotor position). Accordingly, at step 306, the controller 218 may be configured to determine rotor position of the IPM motor 202 based on the extracted one or more triplen harmonics. More particularly, the controller 218 may be configured to determine the rotor position based on a phase angle of the extracted one or more triplen harmonics, which is of the order of the ninth harmonic and higher than the ninth harmonic. In some embodiments, the rotor position may be determined based on the phase angle of the extracted triplen harmonics.

In some embodiments, in order to determine the rotor position, the controller 218 may be configured to identify the phase angle of the extracted triplen harmonic(s) of the order of the ninth harmonic and higher than the ninth harmonic. In a non-limiting example, the controller 218 may be configured to identify the phase angle based on a zero crossing position of the extracted triplen harmonic(s) with respect to the zero crossing position of the fundamental harmonic. The term "zero crossing position" for a given harmonic refers to an angular position at which the given harmonic changes its magnitude from a positive value to a negative value, or vice-versa.

In particular, in some of these embodiments, the rotor position may be same as the phase angle of the extracted triplen harmonics. Consequently, in these embodiments, the controller 218 may be configured to determine the rotor position as being equivalent to the phase of the extracted triplen harmonics. In some embodiments, the rotor position may be equivalent to the phase angle of the extracted triplen harmonics with a phase-shift, where the phase-shift may be positive or negative. In some embodiments, an amount of the phase-shift may depend on the current drawn by the IPM motor 202.

In particular, in some embodiments, if a single triplen harmonic of the order of the ninth harmonic and higher than the ninth harmonic is extracted (at step 304), the controller is further configured to determine the rotor position based on a phase angle corresponding to the extracted single triplen harmonic, at step 306. In a non-limiting example, the rotor position may be similar to the phase angle corresponding to the extracted single triplen harmonic. In some embodiments, if a plurality of triplen harmonics of the order of the ninth harmonic and higher than the ninth harmonic is extracted, the controller is further configured to determine an average phase angle of phase angles corresponding to the plurality of triplen harmonics. Subsequently, the controller 218 may be configured to determine the rotor position based on the average phase angle. In some embodiments, the rotor position may be similar to the average phase angle. In some other embodiments, the rotor position may be equivalent to the average phase angle with the phase-shift, where the phase-shift may be positive or negative. In some embodiments, the amount of the phase-shift may depend on the current drawn by the IPM motor 202.

In certain embodiments, the controller 218 may be configured to determine the phase-shift based on a look-up table, for example. In a non-limiting example, the look-up table may be generated based on a finite element analysis of the IPM motor 202. The look-up table may include different values of the phase-shift corresponding to different values of the current drawn by the IPM motor 202. As previously noted, the current drawn by the IPM motor 202 may be determined by the controller 218 based on the signals received from one or more of the current sensors 221. Accordingly, when the phase angle (or the average phase angle) is determined, the controller may also be configured to identify the phase-shift based on the current drawn by the IPM motor 202 based on the look-up table. Subsequently, the controller 218 may be configured to determine the rotor position as the sum of the phase angle (or the average phase angle) and the identified phase-shift, where the phase-shift may be positive or negative.

In some embodiments, in order to determine the rotor position, it may be advantageous to use the triplen harmonics of the order of ninth harmonic and higher than the ninth harmonic in comparison to the third harmonic. This is because the triplen harmonics of the order of the ninth harmonic and higher than the ninth harmonic of the back-EMF (e.g., the phase voltage signal(s)) are affected lesser due to respective preceding harmonics of the inductance profile of the IPM motor 202 in comparison to effect of a second harmonic of the inductance profile on the third harmonic of the back-EMF. For example, the distorting effect of an eighth harmonic of the inductance profile on the ninth harmonic of the back-EMF is lower in comparison to a distorting effect of the second harmonic of the inductance profile on the third harmonic of the back-EMF as a magnitude of the eighth harmonic is significantly lower than the magnitude of the second harmonic. Consequently, the effect of load current variations is reduced on the triplen harmonics of the order of ninth harmonic and higher than the ninth harmonic of the back-EMF.

Furthermore, in some embodiments, at step 308, the controller 218 may be configured to generate one or more control signals based at least on the rotor position determined at step 306. In certain embodiments, the controller 218 may generate one or more control signals additionally based on a desired torque and a desired operating speed (rpm) of the IPM motor 202.

In addition, at step 310, at least one of the phase current or the phase voltage may be supplied to the one or more phase terminals 206-210 based at least on the rotor position to facilitate operation of the IPM motor 202 at a desirable speed while maintaining a desirable torque. More particularly, the inverter 220 may be configured to adjust the supply of the phase current and/or the phase voltage based on the one or more control signals received from the controller 218. For example, based on the control signals from the controller 218, the inverter 220 may be configured to control amplitude, frequency, and/or phase of the phase current and/or the phase voltage being supplied to the phase terminals 206-210 such that the IPM motor 202 may be operated at the desired speed while maintaining the desired torque.

Figure 4:
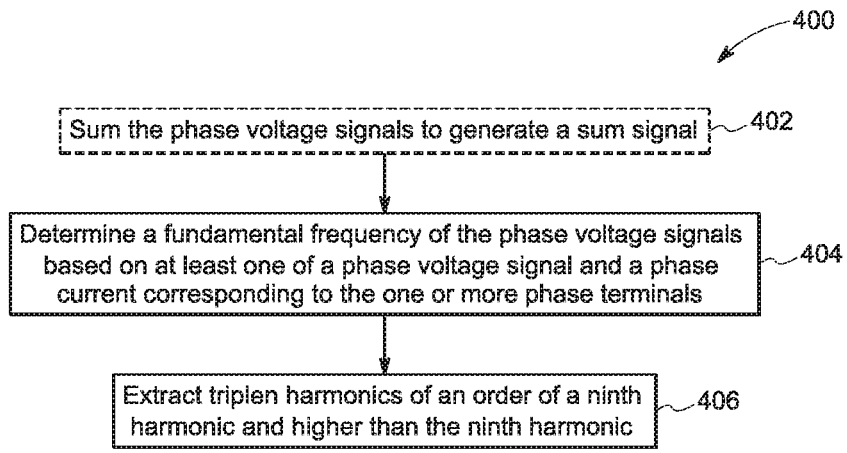
FIG. 4 is a flowchart of an example method of extracting one or more triplen harmonics of the order of the ninth harmonic and higher than the ninth harmonic, in accordance with aspects of the present specification.

FIG. 4 is a flowchart 400 of an example method for extracting the one or more triplen harmonics of the order of the ninth harmonic and higher than the ninth harmonic, in accordance with aspects of the present specification. In particular, the flowchart 400 represents detailed process for performing the step 304 of FIG. 3 to extract one or more triplen harmonics of the order of the ninth harmonic and a triplen harmonic higher than the ninth harmonic of the fundamental frequency of the phase voltage signal corresponding to the one or more phase terminals 206-210.

As previously noted, the controller 218 may be in receipt of the phase voltage signals from the sensor electronics 216 at step 302. In some embodiments, at step 402, the controller 218 may optionally be configured to sum the phase voltage signals to generate a sum signal. In some embodiments, the sum signal includes the triplen harmonics of the fundamental frequency.

Further, in some embodiments, at step 404, the controller 218 may also be configured to determine the fundamental frequency of the phase voltage signal based on at least one of the phase voltage signal and a phase current corresponding to the one or more phase terminals 206-210. Typically, the fundamental frequencies of all three phase voltage signals are substantially similar. As previously noted, the phase current drawn by the IPM motor 202 at one or more of the phase terminals 206-210 may be supplied to the controller 218 by the current sensors 221. In some embodiments, the fundamental frequency may be similar to a frequency of the phase current (received from the current sensors 221) corresponding to the one or more phase terminals 206-210. In some embodiments, the fundamental frequency may be similar to a frequency of the phase voltage signals (generated by the sensor electronics 216) corresponding to the one or more phase terminals 206-210.

It is to be noted that in FIG. 4, although the step 404 is shown subsequent to the step 402, the step 404 may also be executed prior to or in parallel with the step 402, without limiting the scope of the present specification.

Furthermore, at step 406, the controller 218 may extract the triplen harmonics of the order of the ninth harmonic and higher than the ninth harmonic. In some embodiments, the controller 218 may extract the triplen harmonics of the order of the ninth harmonic and higher than the ninth harmonic from the sum signal. In some embodiments, the controller 218 may extract the triplen harmonics of the order of the ninth harmonic and higher than the ninth harmonic from one or more of the phase voltage signals.

In one embodiment, in order to extract the triplen harmonics of the order of the ninth harmonic and higher than the ninth harmonic, the controller 218 may be configured to determine their respective harmonic frequencies based on the determined fundamental frequency (F). For example, the controller 218 may determine the ninth harmonic frequency ($F_9$) as 9*F. Similarly, the controller 218 may also determine the harmonic frequencies corresponding to the triplen harmonics higher than the ninth harmonic.

For higher order of triplen frequencies, effects of load variations on the corresponding triplen harmonics may reduce. However, with increase in the order of the triplen frequencies, magnitude of the respective triplen harmonics decreases. Consequently, although it may be desirable to use higher order triplen harmonics for the determination of the rotor position, it may be desirable to identify a particular triplen harmonic, may be based on the respective magnitude of that particular triplen harmonic. Therefore, in some embodiments, the controller 218 may be configured to identify a particular triplen harmonic of the order of the ninth harmonic and higher than the ninth harmonic based on the respective magnitudes of the particular triplen harmonic. Further, in some embodiments, to identify the particular triplen harmonic, the controller 218 may be configured to compare magnitudes of the triplen harmonics of the order of the ninth harmonic and higher than the ninth harmonic with a threshold magnitude value. In one embodiment, the controller 218 may be configured to compare the magnitudes of the triplen harmonics of the order of the ninth harmonic and higher than the ninth harmonic with the threshold magnitude value in a descending order of the triplen frequencies. Further, once the comparison is performed, the controller 218 may be configured to identify the one or more triplen harmonics having magnitudes greater than the threshold magnitude value.

In some embodiments, the controller 218 may be configured to identify a single triplen harmonic based on the threshold magnitude value. In particular, if corresponding magnitude of a particular single triplen harmonic is greater than the threshold magnitude value, the particular single triplen harmonic is identified by the controller 218. When the comparison is performed in the descending order of the triplen frequencies, in some embodiments, the controller 218 may be configured to identify a single triplen harmonic for which a condition of corresponding magnitude being greater than the threshold magnitude value is first identified. In some other embodiments, the controller 218 may be configured to identify a plurality of triplen harmonics of the order of the ninth harmonic and higher than the ninth harmonic having respective magnitudes that are greater than the threshold magnitude value.

In some embodiments, the controller 218 may be configured to identify a single triplen harmonic (of the order of the ninth harmonic and higher than the ninth harmonic) having highest magnitude.

In some embodiments, once a single or a plurality of triplen harmonics is identified, the controller 218 may be configured to extract the identified triplen harmonic from the sum signal. In some embodiments, the controller 218 may extract the identified triplen harmonics by multiplying a sinusoidal signal of corresponding harmonic frequency with the sum signal. For example, if the identified triplen harmonic is the ninth harmonic (i.e., a single triplen harmonic), the controller 218 may be configured to multiply a sinusoidal signal of frequency 9*F with the sum signal in order to extract the ninth harmonic. Similarly, if the identified triplen harmonics are ninth, fifteenth, and twenty first harmonics (i.e., a plurality of triplen harmonics), the controller 218 may be configured to separately multiply the sum signal with sinusoidal signal of frequencies 9*F, 15*F, 21*F, respectively, to extract the ninth, fifteenth, and twenty first harmonics.

In some other embodiments, once a single or a plurality of triplen harmonics is identified, the controller 218 may be configured to extract the identified triplen harmonic from any of the phase voltage signals, for example, by using a notch filter. In some embodiments, the controller 218 may extract the identified triplen harmonics by multiplying a sinusoidal signal of corresponding harmonic frequency with a given phase voltage signal of the phase voltage signals. In some embodiments, a result signal of the multiplication may be additionally passed through a low pass filter. For example, if the identified triplen harmonic is the ninth harmonic (i.e., a single triplen harmonic), the controller 218 may be configured to multiply a sinusoidal signal of frequency 9*F with the given phase voltage signal to extract the ninth harmonic. Similarly, if the identified triplen harmonics are ninth, fifteenth, and twenty first harmonics (i.e., a plurality of triplen harmonics), the controller 218 may be configured to separately multiply the given phase voltage signal with sinusoidal signals of frequencies 9*F, 15*F, 21*F, respectively, to extract the ninth, fifteenth, and twenty first harmonics.

In some other embodiments, the controller 218 may be pre-configured with a selection of a specific triplen harmonic of the order of the ninth harmonic and higher than the ninth harmonic. In one embodiment, information corresponding to the determined triplen harmonics that needs to be extracted may be stored in a memory associated with the controller 218. For example, once the sum signal is generated by the controller 218, the controller 218 may extract the determined triplen harmonic from the sum signal. In a non-limiting example, if the determined triplen harmonic is the ninth harmonic, the controller 218 may be configured to multiply a sinusoidal signal of frequency 9*F with the sum signal (or the given phase voltage signal) to extract the ninth harmonic.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements and are not limited to any particular computer hardware, software, middleware, firmware, microcode, and the like.

Furthermore, the foregoing examples, demonstrations, and method steps such as those that may be performed by the controller 218 may be implemented by suitable code on a processor-based system, such as a general-purpose or special-purpose computer. Different implementations of the systems and methods may perform some or all of the steps described herein in different orders, parallel, or substantially concurrently. Furthermore, the functions may be implemented in a variety of programming languages, including but not limited to C++ or Java. Such code may be stored or adapted for storage on one or more tangible, computer readable media, such as on data repository chips, local or remote hard disks, optical disks (that is, CDs or DVDs), memory or other media, which may be accessed by a processor-based system to execute the stored code.

The systems and methods described herein aids in determining a rotor position in IPM motors. More particularly, the systems and methods described herein facilitates determination of the rotor position without employing any position sensors and/or encoders, thereby reducing overall cost of the motor assemblies. Also, the motor assembly in accordance with the embodiments of the present specification is compact as no position sensors and/or encoders are employed. Furthermore, systems and methods described herein facilitate reliable and accurate determination of the rotor position by using information corresponding to one or more the triplen harmonics of the order of ninth harmonic and higher than the ninth harmonic.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following embodiments.

What is claimed is:

1. A driver unit for an interior permanent magnet motor, comprising:
   sensor electronics configured to sense a phase voltage corresponding to one or more phase terminals of the interior permanent magnet motor to generate a corresponding phase voltage signal;
   a controller electrically coupled to the sensor electronics and configured to:
      identify one or more triplen harmonics of an order of a ninth harmonic and higher than the ninth harmonic;
      extract one or more triplen harmonics of the order of the ninth harmonic and higher than the ninth harmonic of a fundamental frequency of the phase voltage signal corresponding to the one or more phase terminals;
      determine an angular position of a rotor of the interior permanent magnet motor based on the extracted one or more triplen harmonics, wherein the controller generates at least one signal based on the angular position of the rotor; and
   an inverter, wherein the inverter is configured to adjust the supply of at least one of the phase voltage or a phase current based at least in part on the signal.

2. The driver unit of claim 1, wherein the controller is further configured to determine the fundamental frequency of the phase voltage signal based on at least one of the phase voltage signal and a phase current corresponding to the one or more phase terminals.

3. The driver unit of claim 1, wherein the controller is configured to sum the phase voltage signals to generate a sum signal, wherein the sum signal comprises triplen harmonics.

4. The driver unit of claim 3, wherein the controller is further configured to extract, from the sum signal, the one or more triplen harmonics of the order of the ninth harmonic and higher than the ninth harmonic of the fundamental frequency.

5. The driver unit of claim 1, wherein the controller is further configured to extract, from one or more of the phase voltage signals, the one or more triplen harmonics of the order of the ninth harmonic and higher than the ninth harmonic of the fundamental.

6. The driver unit of claim 1, wherein the controller is further configured to:
   compare magnitudes of the triplen harmonics of the order of the ninth harmonic and higher than the ninth harmonic with a threshold magnitude value; and
   identify the one or more triplen harmonics having magnitudes greater than the threshold magnitude value.

7. The driver unit of claim 6, wherein the controller is configured to compare, in a descending order of triplen frequencies, magnitudes of the triplen harmonics of the order of the ninth harmonic and higher than the ninth harmonic with a threshold magnitude value.

8. The driver unit of claim 6, wherein the controller is configured to extract a triplen harmonic for which a condition of corresponding magnitude being greater than the threshold magnitude value is first identified.

9. The driver unit of claim 1, wherein the controller is configured to extract a triplen harmonic of the order of the ninth harmonic and higher than the ninth harmonic comprising a highest magnitude.

10. The driver unit of claim 1, wherein, if a plurality of triplen harmonics of the order of the ninth harmonic and higher than the ninth harmonic is extracted, the controller is further configured to:
    determine an average phase angle of phase angles corresponding to the plurality of triplen harmonics; and
    determine the angular position of the rotor based on the average phase angle.

11. The driver unit of claim 1, wherein, if a single triplen harmonic of the order of the ninth harmonic and higher than the ninth harmonic is extracted, the controller is further configured to determine the angular position of the rotor based on a phase angle corresponding to extracted single triplen harmonic.

12. A motor assembly, comprising:
    an interior permanent magnet motor comprising one or more phase terminals, a rotor, and a stator; and
    a driver unit electrically coupled to the interior permanent magnet motor at the one or more phase terminals, wherein the driver unit comprises:
       sensor electronics configured to sense a phase voltage corresponding to the one or more phase terminals to generate a corresponding phase voltage signal;
       a controller electrically coupled to the sensor electronics and configured to:
          identify one or more triplen harmonics of an order of a ninth harmonic and higher than the ninth harmonic;
          extract one or more triplen harmonics of the order of the ninth harmonic and higher than the ninth harmonic of a fundamental frequency of the phase voltage signal corresponding to the one or more phase terminals;
          determine an angular position of the rotor based on the extracted one or more triplen harmonics, wherein the controller generates at least one signal based on the angular position of the rotor; and
       an inverter, wherein the inverter is configured to adjust the supply of at least one of the phase voltage or a phase current based at least in part on the signal.

13. A method for controlling an interior permanent magnet motor, comprising:
    receiving phase voltage signals corresponding to one or more phase terminals of the interior permanent magnet motor;
    identifying, using a controller, one or more triplen harmonics of an order of a ninth harmonic and higher than the ninth harmonic;
    extracting, using the controller electrically coupled to the sensor electronics, one or more triplen harmonics of the order of the ninth harmonic and higher than the ninth harmonic of a fundamental frequency of the phase voltage signal corresponding to the one or more phase terminals;
    determining an angular position of a rotor of the interior permanent magnet motor based on the extracted one or more triplen harmonics;
    generating a signal, using the controller, based on the angular position of the rotor;
    adjusting at least one of the supply of a phase current or phase voltage based at least in part on the signal; and
    supplying the at least one of the phase current or phase voltage to the one or more phase terminals based at least on the angular position of a rotor.

14. The method of claim 13, further comprising determining the fundamental frequency of the phase voltage signal based on at least one of the phase voltage signal and the phase current corresponding to the one or more phase terminals.

15. The method of claim 13, wherein extracting the one or more triplen harmonics of the order of the ninth harmonic and higher than the ninth harmonic comprises summing the phase voltage signals to generate a sum signal, wherein the sum signal comprises triplen harmonics.

16. The method of claim 15, wherein extracting one or more triplen harmonics of the order of the ninth harmonic and higher than the ninth harmonic of the fundamental frequency comprises:
    comparing magnitudes of the triplen harmonics of the order of the ninth harmonic and higher than the ninth harmonic with a threshold magnitude value; and
    identifying the one or more triplen harmonics having magnitudes greater than the threshold magnitude value.

17. The method of claim 16, wherein the comparison is performed in a descending order of triplen frequencies.

18. The method of claim 16, wherein extracting one or more triplen harmonics of the order of the ninth harmonic and higher than the ninth harmonic of the fundamental frequency comprises extracting a triplen harmonic for which a condition of corresponding magnitude being greater than the threshold magnitude value is first identified.

19. The method of claim 13, wherein, if a plurality of triplen harmonics of the order of the ninth harmonic and higher than the ninth harmonic is extracted, determining the angular position of the rotor comprises determining an average phase angle of phase angles corresponding to the plurality of triplen harmonics, and wherein the angular position of the rotor is determined based on the average phase angle.

20. The method of claim 13, wherein, if a single triplen harmonic of the order of the ninth harmonic and higher than the ninth harmonic is extracted, the angular position of the rotor is determined based on a phase angle corresponding to extracted single triplen harmonic.

* * * * *